(12) United States Patent
Obioha et al.

(10) Patent No.: US 6,245,854 B1
(45) Date of Patent: Jun. 12, 2001

(54) FLUOROCARBON-CONTAINING HYDROPHILIC POLYMER COATING COMPOSITION FOR HEAT EXCHANGERS

(75) Inventors: Chimere N. Obioha, Detroit; Riad A. Farah, Northville; Dennis Schuetzle, West Bloomfield, all of MI (US); Yun-xiang Zhang, Shanghai (CN)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/209,840

(22) Filed: Dec. 11, 1998

(51) Int. Cl.⁷ .................. C09D 127/12; C09D 129/04; C09D 133/14; C09D 133/26; C09D 139/04
(52) U.S. Cl. .................. 525/57; 165/133; 165/134.1; 165/DIG. 514; 525/57; 525/192; 525/199; 525/200; 525/205; 525/212; 525/217; 525/218; 525/222; 525/223; 525/227; 525/230; 525/916; 525/60
(58) Field of Search .................. 165/133, 134.1, 165/DIG. 514, 905; 524/462, 520, 503, 524; 106/15.05, 18.32, 18.35; 525/916, 57, 200, 60, 205, 192, 217, 222, 199, 212, 201, 218, 223, 227, 230

(56) References Cited

U.S. PATENT DOCUMENTS

| | | |
|---|---|---|
| 3,282,905 | 11/1966 | Fasick et al. . |
| 3,503,915 | 3/1970 | Peterson . |
| 3,838,104 | 9/1974 | Hayashi et al. . |
| 3,919,183 * | 11/1975 | Jager et al. ................. 260/86.1 R |
| 3,997,507 | 12/1976 | Kirimoto et al. . |
| 4,775,588 * | 10/1988 | Ishii et al. ..................... 428/327 |
| 4,851,472 | 7/1989 | Famili et al . |
| 5,010,141 * | 4/1991 | Mueller ........................ 525/276 |
| 5,010,153 | 4/1991 | Famili et al. . |
| 5,012,862 | 5/1991 | Espeut et al. . |
| 5,021,527 | 6/1991 | Ohmori et al. . |
| 5,030,684 | 7/1991 | Rauch-Puntigam . |
| 5,081,165 | 1/1992 | Inukai et al. . |
| 5,137,067 | 8/1992 | Espeut . |
| 5,211,989 * | 5/1993 | Clinnin et al. .................. 427/388.4 |
| 5,362,847 | 11/1994 | Miller et al. . |
| 5,376,411 | 12/1994 | Nishishita . |
| 5,478,872 | 12/1995 | Yamasoe et al. . |
| 5,562,949 | 10/1996 | Steele et al. . |
| 5,580,370 | 12/1996 | Kuma et al. . |
| 5,616,388 | 4/1997 | Tatsuno et al. . |
| 5,688,855 | 11/1997 | Stoy et al. . |
| 5,965,659 * | 10/1999 | Kubo et al. ..................... 524/504 |

FOREIGN PATENT DOCUMENTS

| | | | |
|---|---|---|---|
| 521 605 * | 1/1993 | (EP) | .............. C09D/4/00 |
| 857689 | 1/1961 | (GB) . | |
| 63-170492 * | 7/1988 | (JP) | .............. C10M/173/00 |

OTHER PUBLICATIONS

WPI Abstract Accession No. 1988–238235 [34] & JP 63170492 A (Sumitomo), see Abstract.

* cited by examiner

Primary Examiner—David W. Wu
Assistant Examiner—K. C. Egwim
(74) Attorney, Agent, or Firm—Larry I. Shelton

(57) ABSTRACT

A hydrophilic coating composition for hydrophilically coating a metallic surface. The coating composition comprises a fluorocarbon-containing hydrophilic polymer comprising units of hydrophilic monomer and fluorocarbon-containing hydrophobic comonomer. The coating composition produces hydrophilic coatings on the metallic surface having a contact angle below about 50°.

19 Claims, No Drawings

FLUOROCARBON-CONTAINING HYDROPHILIC POLYMER COATING COMPOSITION FOR HEAT EXCHANGERS

TECHNICAL FIELD

This invention relates to hydrophilic fluorocarbon-containing coating compositions, and in particular, to a hydrophilic fluorocarbon-containing coating composition for application to metallic surfaces, such as heat exchangers.

BACKGROUND ART

A typical heat exchanger comprises a plurality of parallel, spaced apart fins defining air flow passages. The fins are typically made of aluminum and aluminum alloys due to the excellent heat conductance properties of aluminum. The heat exchanger fins are designed to have surface areas which are as large as possible, and spaces between the fins which are as narrow as possible without increasing the resistance to air flow between the fins, in order to increase the heat radiation or cooling effect.

As a result, particularly when the heat exchanger is used for cooling, moisture from warm air passing through the heat exchanger condenses on the cold fin surfaces and, if those surfaces are hydrophobic, beads of water accumulate to block the narrow passages between adjacent heat exchanger fins. The increased resistance to air flow operates to reduce the efficiency of the heat exchangers.

In order to help prevent the accumulation of water between heat exchanger fins, the surfaces of the heat exchanger fins have been coated with hydrophilic coatings so that a thin film of water coating the surface can readily slide off the surface of the heat exchanger fins, a phenomenon known as "sheeting off", to prevent blockage of the narrow passages between the adjacent heat exchanger fins.

The hydrophilic coatings which have been employed to date have included chromates and silicates. These hydrophilic coatings have some undesirable characteristics which include, being toxic, producing an unpleasant odor, and having relatively weak corrosion resistance due to relatively poor adhesion to surfaces and high surface coating porosity which can allow corrosive materials to permeate and react with metal surfaces.

Accordingly, it would be desirable to provide a hydrophilic coating composition which produces coatings which are non-toxic, do not produce an unpleasant odor and have improved corrosion resistance.

Also, the coatings should be less than, or equal to, about 5 microns, uniform and essentially free of gaps and/or holes. Thus, it would be desirable to provide coatings which are thin, uniform and essentially free of gaps and/or holes.

DISCLOSURE OF INVENTION

An object of the present invention is to provide a coating composition which produces coatings which are non-toxic, do not produce unpleasant odors and have improved corrosion resistance.

For carrying out the above, and other objects, the present invention provides a hydrophilic coating composition for hydrophilically coating a metallic surface. The hydrophilic coating composition comprises a fluorocarbon-containing hydrophilic polymer comprising units of a hydrophilic monomer and units of a fluorocarbon-containing hydrophobic comonomer. The coating composition produces hydrophilic coatings on metallic surfaces having a contact angle below about 50°. Preferably, the fluorocarbon-containing hydrophilic polymer comprises mostly units of hydrophilic monomers and very few units of hydrophobic comonomers, with the comonomers containing hydrophobic units to make associative domain between macro-molecules.

BEST MODE FOR CARRYING OUT THE INVENTION

The present invention comprises a hydrophilic coating composition for producing hydrophilic coatings on metallic surfaces, such as aluminum, steel, titanium, copper, nickel, and their alloys. The metallic surfaces for which the hydrophilic coating composition of the present invention are useable with any metallic surface which may benefit from a hydrophilic coating. The coating composition of the present invention are particularly well suited for use with heat exchangers for automobile cooling systems, and as such will be described herein for application to heat exchangers, but in doing so is not intended to limit their use to automotive heat exchangers.

The hydrophilic coating composition of the present invention minimally comprises, based on the weight of the coating composition, from about 0.05 to about 10 weight percent fluorocarbon-containing hydrophilic polymer (FHP), from about 1 to about 20 weight percent water soluble polymer, from about 1 to about 5 weight percent curing agent, and from about 5 to about 98 weight percent water. More preferably, the hydrophilic coating composition comprises, based on the weight of the coating composition, from about 0.1 to about 3 weight percent fluorocarbon-containing hydrophilic polymer, from about 1 to about 5 weight percent water soluble polymer, from about 1 to about 3 weight percent curing agent, and from about 89 to about 98 weight percent water. Most preferably, the hydrophilic coating composition comprises, based on the weight of the hydrophilic coating composition, about 0.5 weight percent fluorocarbon-containing hydrophilic polymer, about 2.5 weight percent water soluble polymer, about 1 weight percent curing agent, and about 96 weight percent water. Optionally, the hydrophilic coating composition may also contain up to about 2 weight percent, based on the weight of the coating composition, of antimicrobial agent.

The fluorocarbon-containing hydrophilic polymer preferably has a molecular weight of between about 50,000 to about 6,000,000, more preferably from about 300,000 to about 2,000,000, and most preferably from about 500,000 to about 1,000,000. The fluorocarbon-containing hydrophilic polymer can be either a copolymer or a terpolymer.

The fluorocarbon-containing hydrophilic polymer comprises units of hydrophilic monomer and units of hydrophobic comonomer. The units of hydrophobic comonomer are preferably present in the fluorocarbon-containing hydrophilic polymer in an amount which is sufficient to impart a hydrophilic surface on the metallic surface when the hydrophilic coatings are formed thereon.

A hydrophilic surface is defined for the purpose of the present invention as one having a contact angle of less than about 50° when measured in accordance with ASTM NO. D-724. The hydrophilic coating composition of the present invention, when coated on metallic surfaces, preferably imparts a contact angle as determined by ASTM No. D-724 of less than about 40°, more preferably less than about 20°, and most preferably less than about 10°.

To provide a hydrophilic surface, the units of hydrophobic comonomer are preferably present in the hydrophilic polymer in an amount of less than about 10 mole percent, more preferably in an amount of about 0.01–5 mole percent, and most preferably in an amount of about 0.01 to 1.0 mole percent. Preferably, the backbone of the fluorocarbon-containing hydrophilic polymer essentially comprises the hydrophilic monomer units, and the hydrophobic comonomer units essentially comprise side- and/or end-chains of the polymer. The hydrophobic side- and/or end-chains are believed to have intermolecular interactions between fluorocarbon groups in the polymer solution. It is believed, without wishing to be bound to any particular theory, that anymore than about 10 mole percent of hydrophobic comonomer will result in undissolved fluorocarbon-containing hydrophilic polymer and the fluorocarbon-containing polymer possessing a hydrophobic characteristic.

The hydrophilic monomers used in forming the fluorocarbon-containing hydrophilic polymer of the present invention can be any suitable hydrophilic monomer, such as vinyl monomers. Examples of suitable vinyl monomers include vinyl alcohol, polyvinyl acetate, vinyl pyrrolidone, and acrylamide.

The hydrophilic monomer is preferably represented by the general formula (I).

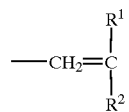

(I)

where $R^1$=H or $CH_3$ and

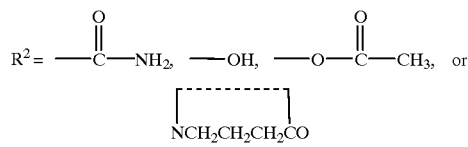

In an alternative embodiment, the hydrophilic monomer could be a co-monomer of vinyl monomer and an ionic monomer. Preferred ionic monomers include, but are not limited to, sodium 2-acylamilido 2-methyl propane sulfonate, which is an anionic monomer available from Aldrich Chemical Company under the name NaAmps, and acryloyloxyethyl trimethyl ammonium chloride, which is a cationic monomer available from Aldrich Chemical Company under the name DMAEA-Q.

When the hydrophilic monomer is a co-monomer of vinyl monomer and ionic monomer, the molar ratio of vinyl monomer to anionic monomer is between 90:10 and 10:90, and is preferably 70:30. The mole percent of the hydrophobic comonomer is preferably between about 0.05 to about 5 mole percent of the hydrophilic polymer when ionic monomer is present in the hydrophilic polymer. The hydrophilic polymer containing ionic monomer may be made by any suitable polymerization techniques, such as homogeneous polymerization, micellar polymerization, bulk polymerization, solution polymerization, suspension polymerization, emulsion polymerization, radiation polymerization or photo polymerization reactions.

The hydrophobic comonomer contains hydrophilic units and fluorocarbon-containing associating hydrophobic units. Preferably, the hydrophilic units of the hydrophobic comonomer comprise vinyl monomer and the hydrophobic units comprise fluorocarbon-containing ester which can be associated to make the associative domain in polymer solution by intermolecular interaction.

The hydrophobic comonomers used in forming the polymer are preferably represented by the general formula (II).

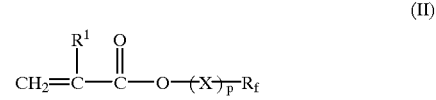

(II)

where
$R^1$ represents H or $CH_3$
X represents an organic linking group;
$R_f$ is a perfluoronated alkyl or
perfluoronated poly-(aklyleneoxy) group; and
p is 0 or 1.

Preferably, $R^1$ is preferably $CH_3$ in Formula (II).

The comonomers of formula (II) are fluorine-containing ester derivatives of an acrylic acid, namely acrylic acid or methacrylic acid. These acrylate ester comonomers may contain an organic linking group X which functions to connect the fluorine-containing group $R_f$ with the polymer backbone via the ester functionality. The preferred X group is

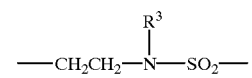

where $R^3$ is a $C_1$–$C_4$ alkyl group such as methyl, ethyl, isopropyl, isobutyl and the like, but X may also be a lower $(C_1$–$C_4)$alkylene group such as methylene, ethylene, propylene and the like, X may also be a lower alkyl ether or alkylthio ether group.

Contemplated as the functional, or operative, equivalent of the F-(meth)acrylate ester monomers for purposes of this invention are F-(meth)acrylamide monomers in which the nitrogen atom of the amide moiety is bonded to —$(X)_m$—$R_f$.

The $R_f$ moiety may be a perfluoroalkyl group containing 2 to 20 carbon atoms examples of which may be represented by $R^2$—$(CF_2)_n$— and $(CF_3)_2CF^2$—$(CF_2)_p$ where $R^2$ is F and n is 2 to 20, preferably 4 to 8, and p is 0 to 17. When $R_f$ is a perfluoro poly(ethyleneoxy) or poly(propyleneoxy) group, suitable illustrative groups are represented by

where n is 1 to 10, preferably 1 to 5, $R^4$ represents H, $C_1$–$C_{20}$ alkyl or perfluoroalkyl, $C_6$–$C_{20}$ aryl or perfluoroaryl, or $C_7$–$C_{30}$ alkylarly or perfluoroalkylaryl and $R^5$ represents F or —$CF_3$. Thus the perfluoronated poly(alkyleneoxy) acrylate monomers can terminate in a free hydroxyl group or be end-capped with a $C_1$–$C_{20}$ alkyl group such as methyl, ethyl, butyl, oxtyl, dedecyl and the like; and $C_6$–$C_{20}$ aryl group such as phenyl, naphyl and the like; or a $C_6$–$C_{30}$ alkylaryl group such as tolyl, methylnaphthyl, and the like, which end-cap groups may be perfluoronated. It is preferred that $R^4$ be hydrogen.

When $R^5$ is trifluoromethyl, i.e. when the acrylate monomer contains perfluoronated propyleneoxy units, it is possible that the trifluoromethyl group could be on the adjacent carbon atom depending upon the synthesis route used to prepare the F-acrylate comonomer.

It is preferred to use the methacrylate esters, i.e. R is $CH_3$, because of their superior stability under alcoholysis conditions.

Many of the F-(meth)acrylate comonomers are commercially available from E. I. DuPont de Nemours & Co. and the 3M Company, such as FX-13 [2-(N-ethyl perfluoro-octane sulfonamide) ethyl acrylate] when P=H, and RX-14 [2-(N-(N-ethyl perfluorooctane sulfonamide) ethyl methacrylate] when R=$CH_3$, or can be prepared according to the teachings in U.S. Pat. No. 3,282,905; EP No. 190,993A; and EP No. 158,854A. The comonomers can also be prepared with blocks of thyleneoxy units and propyleneoxy units some of which are perfluoronated and some of which are not, or mixtures thereof.

Thus, a preferred hydrophilic polymer comprises units represented by the general formula (III).

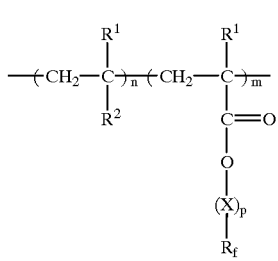

(III)

where $R^1$=H or $CH_3$

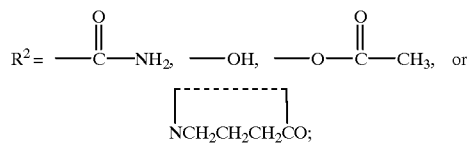

x=an organic linking group;
p=0 or 1;
$R_f$=is a perfluoronated alkyl or perfluoronated poly-(aklyleneoxy) group;
m=0.01–10 mole percent; and
n=90–99.99 mole percent More preferably, m is equal to about 0.01–5 mole percent and n is equal to about 95–99.99 mole percent. Most preferably, m is equal to about 0.01–1.0 mole percent and n is equal to about 99–99.99 mole percent.

When the hydrophilic monomer is a co-monomer of vinyl monomer and ionic monomer, the hydrophilic polymer is a terpolymer preferably comprising units represented by the general formula (IV).

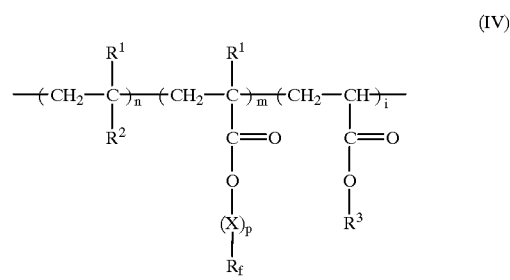

(IV)

where $R^1$=H or $CH_3$

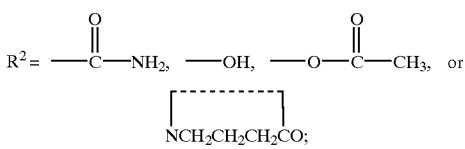

x=an organic linking group;
p=0 or 1;
$R_f$=is a perfluoronated alkyl or perfluoronated poly-(aklyleneoxy) group;
m=0.01–10 mole percent;
n+i=90–99.99 mole percent;
n/i molar ratio=10/90 to 90/10; and

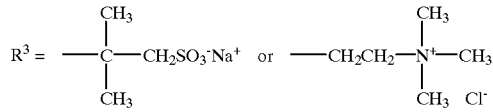

It should also be noted that the hydrophilic polymer could also contain other components such as unreacted polyvinyl alcohol.

The fluorocarbon-containing hydrophilic polymer of the present invention can be formed by homogeneous polymerization, micellar polymerization, bulk polymerization, solution polymerization, suspension polymerization, emulsion polymerization, radiation polymerization or photo polymerization reactions. For example, the hydrophilic monomer and the hydrophobic comonomer, which is preferably dissolved in a solvent, such as a 50:50 acetone and deionized water can be diluted in ionized water and continuously stirred. The resulting liquid can then be purged with an inert gas, such as, pure nitrogen, and stirred to get a homogeneous solution. Ammonium persulfate solution can then be introduced into the homogeneous solution to initiate polymerization at an elevated temperature, such as, 60.0° C. for a period of time, such as, about 24 hours. After polymerization, the viscous polymer solution can be diluted by 4 times volume deionized water and stirred to get a homogenous solution.

The water soluble polymer is present in the hydrophilic coating composition of the present invention in order to make the coating of the present invention a water based, non-toxic coating without using any organic solvents.

The water soluble polymer for use with the present invention may be any suitable water soluble polymer which aids in the adhesion of the hydrophilic coating to metallic surfaces. Examples of suitable water soluble polymers include, but are not limited to, homopolymers and copolymers of epoxides, polyvinyl alcohol, acrylic acid, polyurethane and mixtures thereof. The preferred water soluble polymer is an epoxide resin.

The crosslinking agent for use with the present invention can be any suitable agent which is capable of bringing about the crosslinking of any of the crosslinkable components of the hydrophilic coating composition. Examples of suitable crosslinking agents include, but are not limited to, dialdehydes, diacides, diamines, peroxides, ultraviolet activated crosslinking agents, and mixtures thereof.

The antimicrobial agent, if present, is any substance or combination of substances that kills or prevents the growth of microorganisms, and includes antibiotics, antifungal, antibacterial, antiviral and antialgal agents. The preferred antimicrobial agent is an antifungal agent which includes, but is not limited to, ULTRAFRESH™ DM-25, ULTRAFRESH™ DM-50 AND ULTRAFRESH™ UF-40, ULTRAFRESH™ D110, ULTRAFRESH™ DM-95 available from Thomas Research, INTERSEPT, available from Interface Research Corporation, and AMICAL FLOWABLE™, available from Angus Chemical Company of Northbrook, Ill.

The hydrophilic coating composition may be prepared in any conventional manner known in the art. A preferred manner of preparing the hydrophilic coating composition comprises (1) mixing equal parts of a solution of hydrophilic polymer with a solution of water soluble polymer while continuously stirring, (ii) adding the antifungal agent, if any is employed, to the mixture of hydrophilic polymer/water soluble polymer solution, and (iii) adding the curing agent to the resulting solution. The hydrophilic coating composition preferably has a viscosity of about 50–400 cps.

The hydrophilic polymer solution preferably has a viscosity of about 50–400 cps and is preferably prepared by diluting an aqueous stock solution of about 5–40 weight percent hydrophilic polymer to about 0.1–10 weight percent hydrophilic polymer with the addition of water. Most preferably, the hydrophilic solution is prepared from an aqueous stock solution of about 4–5 weight percent hydrophilic polymer which is slowly diluted, over a time period of about 2–4 hours, to about 1 weight percent hydrophilic polymer with the addition of deionized water while continuously stirring the solution to prevent the precipitation of the hydrophilic polymer.

The water soluble polymer solution preferably has a viscosity of 50–400 cps and is preferably prepared by diluting an aqueous stock solution of about 10–30 weight percent water soluble polymer to about 1–20 weight percent water soluble polymer with the addition of water. Preferably, the water soluble polymer solution is prepared from an aqueous stock solution of about 20 weight percent water soluble polymer which is diluted to about 5 weight percent water soluble polymer with the addition of deionized water.

Preferably, the water soluble polymer solution is added to the hydrophilic polymer solution over a relatively long time period and under continuous stirring. For example, when adding 50 liters of water soluble polymer solution to 50 liters of hydrophilic polymer solution, a time period of about 6 hours should be allowed for completing the addition step.

After the hydrophilic coating composition is prepared, it can be applied to a surface(s) to be coated, such as a heat exchanger, in any conventional manner such as dip coating, spray coating, brush coating, roll coating, spin coating, flow coating, bar coating, screen printing, etc. Preferably, the hydrophilic coating composition is applied by conventional dip coating techniques.

The resulting coating is then cured under the application of heat and/or UV light. Preferably, the coating is cured for a period of 2–60 minutes under a temperature of about 50–200° C., and preferably about 150° C.

The resulting cured coating is between about 2–10 microns and is preferably about 5 microns or less.

The following Examples are meant to describe one preferred embodiment of the present invention.

EXAMPLE 1

Preparation of Hydrophilic Polymer and Hydrophilic Polymer Solution 33.75 g. AM(acrylamide) and 103.5 mg. FX-13 [(N-ethyl perfluorooctane sulfonamide) ethyl acrylate dissolved in 1 ml acetone and 1 ml deionized water] are mixed in 700 ml deionized water in a three necks 1000 ml round-bottom flask with a set mechanic stir and capped with two rubber stoppers. The liquid is purged with pure nitrogen gas for 1 hour. The liquid is stirred to get a homogeneous solution. A 0.1 mol percent ammonium persulfate solution 2.0 ml is then injected into the flask to initiate polymerization at 60.0±2.0 C for 24 hours. After polymerization, the viscous polymer solution is diluted by 4 times volume deionized water and stirred for 4 hours to get a homogeneous solution. The viscosity of the resulting hydrophilic polymers solution is about 300 to 400 cps.

EXAMPLE 2

Preparation of Water Soluble Polymer Solution

A 20 weight percent aqueous stock solution of a water soluble epoxide resin is diluted with deionized water to about 5 weight percent water soluble epoxide resin.

EXAMPLE 3

Preparation of Hydrohilic Coating

A 50:50 mixture of a solution of hydrophilic polymer and water soluble polymer is prepared by adding the solution prepared in Example 2 to the solution prepared in Example 1 over a period of about 1 hour while continuously stirring. An antifungal agent is then added to the resulting solution in an amount of about 0.01 weight percent of the solution. Glutaraldehyde in a 25 percent water solution is then added to the solution in an amount of about 1 weight percent of the solution.

EXAMPLE 4

The coating composition of Example 3 is applied to heat exchangers and cured for 30 minutes at 150° C. forming a coating on the heat exchanger surfaces of about 5 microns thick. The contact angle of the coated heat exchanger surfaces is measured according to ASTM No. D-724 and is found to be about 90°. Pressure drop tests produce favorable results due to the thinness and hydrophilic nature of the coatings. The coated heat exchangers do not have any distinguishable odor. The coated heat exchangers do not have any appreciable microbial or fungal growth.

While the best modes for carrying out the invention have been described in detail, those familiar with the art to which the invention relates will appreciate other ways of carrying out the invention defined by the following claims.

What is claimed is:

1. A hydrophilic coating composition for hydrophilically coating a metallic surface, said coating composition comprising a hydrophilic polymer comprising units of hydrophilic monomer and units of fluorocarbon-containing hydrophobic comonomer, said coating composition producing hydrophilic coatings on the metallic surface having a contact angle below about 50°, wherein said units of hydrophilic monomer include units selected from the group consisting of acrylamide, vinyl acetate, vinyl alcohol, vinyl pyrrolidone and mixtures thereof, wherein said units of hydrophilic monomer further include units selected from the group consisting of hydrophilic cationic and anionic monomers, said hydrophilic polymer being a terpolymer comprising units having the formula:

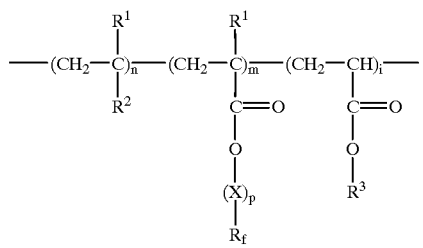

where $R^1$=H or $CH_3$;

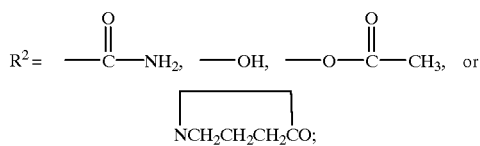

x=an organic linking group;
p=0 or 1;
$R_f$=is a perfluoronated alkyl or perfluoronated poly-(alkyleneoxy) group;
m=0.01–10 mole percent;
n+i=90–99.99 mole percent;
n/i=molar ratio=10/90 to 90/10; and

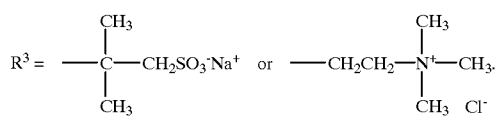

2. The coating composition of claim 1 wherein said contact angle is less than about 20°.

3. The coating composition of claim 1 wherein said coating composition produces hydrophilic coatings on the metallic surface having a contact angle below about 10°.

4. The coating composition of claim 1 further comprising water, a water soluble polymer and a curing agent.

5. The coating composition of claim 1 wherein said hydrophilic polymer has a molecular weight from about 50,000 to about 6,000,000.

6. The coating composition of claim 1 wherein said units of hydrophobic comonomer are present in said hydrophilic polymer from about 0.01 to about 5 mole percent.

7. A heat exchanger having a hydrophilic surface coating, the coating being formed from the coating composition of claim 1.

8. A hydrophilic coating composition for hydrophilically coating a metallic surface, said coating composition comprising a hydrophilic polymer comprising units of hydrophilic monomer and units of fluorocarbon-containing hydrophobic comonomer, said coating composition producing hydrophilic coatings on the metallic surface having a contact angle below about 50°, said coating composition further comprising water, a water soluble polymer and a curing agent, wherein said hydrophilic polymer is present in said coating composition, based on the weight of said coating composition, from about 0.05 to about 10 weight percent, said water soluble polymer being present in said coating composition from about 1 to about 20 weight percent, said curing agent being present in said coating composition from about 1 to about 5 weight percent, and said water being present in said coating composition from about 65 to about 98 weight percent.

9. The coating composition of claim 8 wherein said units of hydrophilic monomer are selected from the group consisting of acrylamide, vinyl acetate, vinyl alcohol, vinyl pyrrolidone and mixtures thereof.

10. The coating composition of claim 8 further comprising an antimicrobial agent, said antimicrobial agent being present in said coating composition from 0.1 to about 2 weight percent, based on the weight of said coating composition.

11. The coating composition of claim 10 wherein said water soluble polymer is selected from the group consisting of homo- and co-polymers of epoxide, polyvinyl alcohol, acrylic acid and polyurethane.

12. The coating composition of claim 8 wherein said units of said hydrophobic comonomer are present in said hydrophilic polymer from about 0.01 to about 10 mole percent.

13. The coating composition of claim 8 wherein said hydrophilic polymer has a molecular weight from about 50,000 to about 6,000,000.

14. The coating composition of claim 8 wherein said contact angle is less about 20°.

15. A method of hydrophilically coating a metallic surface, said method comprising
(i) providing a metallic surface,
(ii) providing a coating composition comprising a hydrophilic polymer comprising units of hydrophilic monomer and units of fluorocarbon-containing hydrophobic comonomer,
(iii) applying the coating composition to the metallic surface; and
(iv) curing the coating composition to form a hydrophilic coating on the metallic surface; wherein said hydrophilic polymer is a terpolymer comprising units having the general formula:

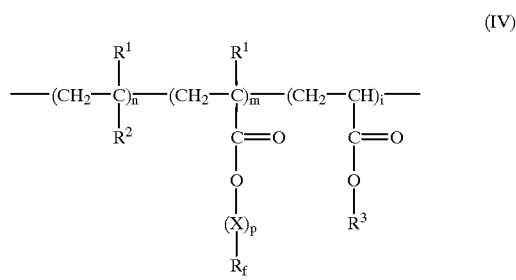

where $R^1$=H or $CH_3$;

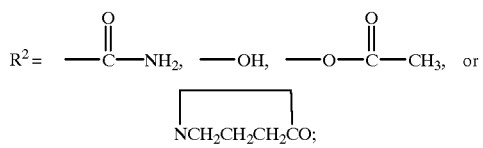

x=an organic linking group;
p=0 or 1;
$R_1$ is a perfluoronated alkyl or perfluoronated poly-(alkyleneoxy) group;
mn=0.01–10 mole percent;
n+i=9–99.99 mole percent;
n/i=molar ratio=10/90 to 90/10; and

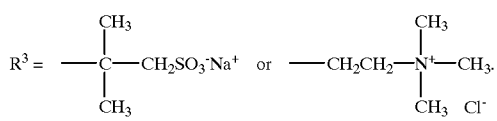

16. A method of hydrophilically coating a metallic surface, said method comprising
   (i) providing a metallic surface,
   (ii) providing a coating composition comprising a hydrophilic polymer comprising units of hydrophilic monomer and units of fluorocarbon-containing hydrophobic comonomer,
   (iii) applying the coating composition to the metallic surface; and
   (iv) curing the coating composition to form a hydrophilic coating on the metallic surface; wherein said coating composition further comprises water, a water soluble polymer and a curing agent, wherein said hydrophilic polymer is present in said coating composition, based on the weight of said coating composition, from about 0.05 to about 10 weight percent, said water soluble polymer being present in said coating composition from about 1 to about 20 weight percents said curing agent being present in said coating composition from about 1 to about 5 weight percent, and said water being present in said coating composition from about 65 to about 98 weight percent.

17. The method of claim 15 wherein the coating is less than about 5 microns thick.

18. The method of claim 15 wherein said units of said hydrophobic comonomer are present in said hydrophilic polymer from about 0.01 to about 10 mole present.

19. The method of claim 15 wherein said coating composition produces hydrophilic coatings on the metallic surface having a contact angle below about 10°.

* * * * *